March 21, 1961 S. KAUFMAN 2,975,719
VARIABLE CAM DRIVEN PUMP
Filed Nov. 7, 1958 2 Sheets-Sheet 1

INVENTOR.
SAMUEL KAUFMAN
BY
George H. Baldwin
ATTORNEY

March 21, 1961 S. KAUFMAN 2,975,719
VARIABLE CAM DRIVEN PUMP
Filed Nov. 7, 1958 2 Sheets-Sheet 2
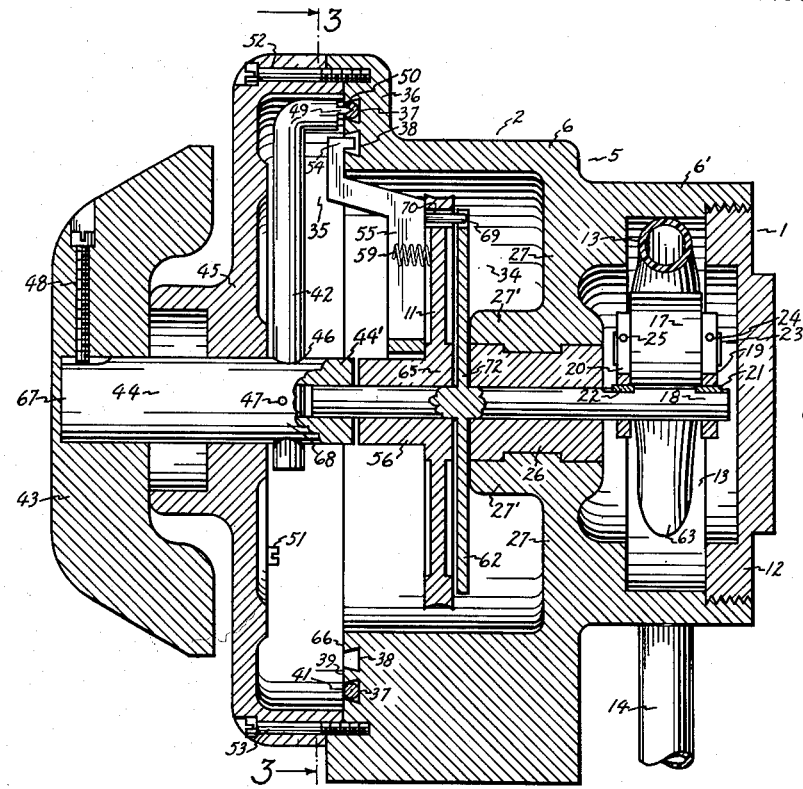
Fig. 2.
Fig. 4.
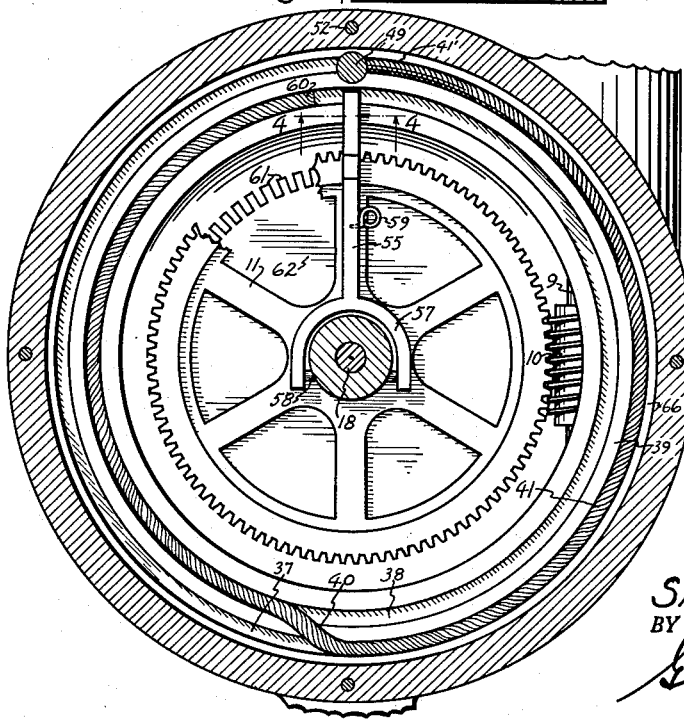
Fig. 3.
INVENTOR.
SAMUEL KAUFMAN
BY
George H. Baldwin
ATTORNEY

United States Patent Office 2,975,719
Patented Mar. 21, 1961

2,975,719
VARIABLE CAM DRIVEN PUMP
Samuel Kaufman, 5506 Floral Bluff Road, Jacksonville 11, Fla.
Filed Nov. 7, 1958, Ser. No. 772,564
8 Claims. (Cl. 103—149)

This invention relates to a liquid pumping device, having particular utility for injecting chlorine or other chemical solutions or slurries into swimming pools, and for similar uses wherein ejection of precisely controlled slurries or chemicals is desired. The invention also pertains to certain subcombinations embodied in the device, including novel cam and intermittent drive mechanisms.

It is an object of the invention to provide an improved device for injecting chemical solutions or slurries into swimming pools.

Chlorine must be added to swimming pools to control the algae, bacteria and the like, the chlorine being added most practically in the form of an aqueous solution. Such solutions are readily obtainable and may vary in their concentration of chlorine in accord with manufacturers' and jobbers' specifications as well as in accord with local laws governing their distribution and use. Consequently a device for injecting chlorine solutions into swimming pools should be adjustable over practical ranges to eject the proper amount of chlorine regardless of the concentration thereof in the solutions employed. Chemicals other than chlorine are often required to be added to swimming pools or in filter systems associated therewith, and the device is useful in supplying at a selected constant unvarying rate such materials as acid or alkaline solutions, alum, or diatomaceous earth slurries. Difficulties have been experienced in other fields in which it is desired to feed at a selected or adjustable but accurately maintained rate various liquids or slurries.

It is a general object of the invention, accordingly, to provide an ejector device capable of supplying at a readily selectible or adjustable but precisely maintained rate any of a wide range of liquids and semi-liquids, such as liquids of low or high viscosity, and slurries of up to about 60 percent solids and which may include abrasive particles.

Few pumping devices can be operated to continuously discharge liquids in accordance with small varying capacity requirements such as desirable for the injection of chlorine solutions into swimming pools and for other uses such as mentioned above. Accordingly resort in the instant invention is taken in the intermittent operation of a pump which is controlled by a continuously operating intermittent drive mechanism and variable cam assembly thereof. With such an intermittent actuation of the pumping mechanism, back leakage of pool water, for example, into the pumping mechanism and chlorine source may take place with prior art arrangements since the chlorine injection devices are usually located below the surface of the pool water and therefore operated against a positive head which exerts a back pressure.

Accordingly an objective of the invention is to provide a pumping device which does not permit back leakage.

Another object of the invention is to provide a device capable of ejecting small selectible but accurately controlled rates of flow of liquid therefrom.

A specific object is to provide a chlorine solution ejector suitable for use in injecting chlorine into swimming pools, the device being characterized by its continuous operation and its intermittent discharge of such solution and being controllable as to the amounts discharged therefrom.

It is another object to provide a liquid pumping device which may be adjusted for use with liquids differing in concentration and which furthermore may be employed with different swimming pools or in other applications having a wide range of chlorine or chemical requirements, the devices being characterized by being capable of continuously operating and intermittently ejecting precisely controllable amounts of liquid when connected to a source thereof.

Another important object is to provide an improved continuously operating intermittent drive mechanism and in particular a variable cam operated intermittent drive mechanism.

Yet another object is to provide an improved cam mechanism having a readily variable land length.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Fig. 2 is a cross sectional view taken generally along the lines 2—2 of Fig. 1.

Fig. 3 is another cross sectional view of the ejector taken generally along the line 3—3 of Fig. 2 and showing particularly the arrangement of certain parts of the cam assembly and intermittent drive mechanism of the ejector.

Fig. 4 is a fragmentary cross sectional view taken along line 4—4 of Fig. 3 showing details of the cam follower and of the free end of the land member.

Figure 1:
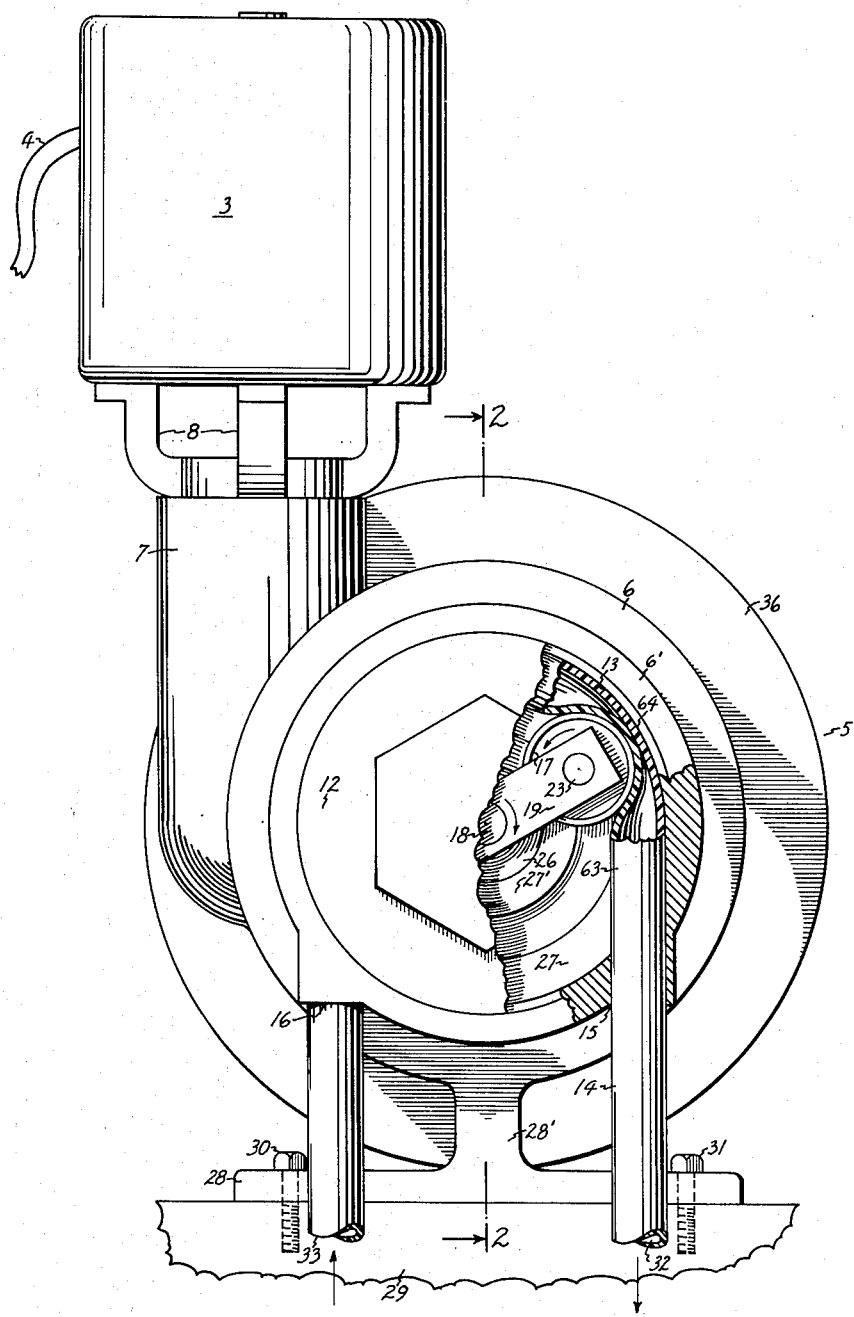
Fig. 1 is an end elevation of a liquid ejector in accord with the invention, certain parts being broken away to show more clearly the operation of the elastic tube pump assembly of said ejector.

The liquid ejector includes an elastic tube pump assembly and an intermittent drive mechanism therefor, the pump assembly and drive mechanism being respectively generally designated at 1 and 2 in Fig. 2. The motor 3 employed in the drive mechanism is shown in Fig. 1 and is attached to a suitable electrical source as by means of cord 4. The liquid ejector has a housing 5 having a cylindrical portion 6 which forms a body member surrounding certain elements of the drive mechanism 2, the end of the cylindrical portion 6 being closed by end bell 45 thereof. Motor 3 is mounted at the side of the cylindrical housing extension 6 by means of motor shaft casing 7 and brackets or arms 8 attached thereto, the motor 3 being mounted in a side position such that its drive shaft 9 to which worm gear 10 is attached is capable of engaging worm wheel 11 in driving relationship. The ejector housing 5 is integrally formed with and mounted on rest plate 28 through web portion 28', the rest plate 28 being attached to a base member 29 by means of bolts 30 and 31.

With respect to the elastic tube pump assembly 1 of the liquid ejector, illustrated in Figs. 1 and 2, the pump is encased in a cylindrical end portion 6' of housing 5, end dust cap 12 being threadedly engaged in housing portion 6' at its end to enclose the pump. The elastic tube pump includes a drive-shaft 18, an elastic tube 14 which passes through the tangential openings 15 and 16 in housing portion 6' and has a portion 63 which rests against the inner cylindrical surface 13 of housing portion 6' in a position above and between said openings; and a pair of rollers, such as roller 17, which are arranged to traverse the inner cylindrical surface 13 and to pinch or pressingly force the walls of the flexible tube portion 63 together so as to trap the liquid therein in advance of their direction of rotation about shaft 18. At least one of the rollers is pressingly engaging tube portion 63 at all times so as to "seal off" the tube and prevent "back leakage" through the pump when the pump is connected to operate against a positive head or back pressure. The rollers are mounted on drive shaft 18 at the opposite ends of parallel side arms 19 and 20, the arms being secured to the shaft 18 by means of keys 21 and 22 respectively. Roller 17 rotates on cross shaft 23, serving as an axle therefor, the shaft 23 being secured at the ends of the respective arms 19 and 20 by means of pins 24 and 25 respectively. Although not shown, another roller is identically mounted at the respective ends of arms 19 and 20 opposite to roller 17. Drive shaft 18 extends through inner plate 27 of housing 5 and is mounted through inner circular plate flange 27' in bearing 26.

In the operation of the elastic tube pump assembly 1 of the liquid ejector, the drive shaft 18 rotates about its axis and causes the rollers to traverse the portion 63 of the elastic tube 14 disposed against the inner surface 13. The rollers as illustrated in Fig. 1 by rollers 17 are so disposed relative to the inner cylindrical surface 13 during their traverse thereof as to press or pinch the walls of tube 17 together as at 64, thereby forcing the liquid in advance of their direction of rotation, as illustrated by the arrow, forward thereof and toward the discharge end 32 of tube 14. As the liquid in tube 14 is forced toward discharge end 32 by the movement of roller 17 a vacuum is created behind the roller 17. A similar action occurs behind the other roller, not shown. This creates a suction in the intake end 33 of tube 17 which forces more liquid into the pump from a liquid source, not shown.

When both rollers are in pressing relationship against the tube portion 63, as for example, when the arms 19 and 20 are horizontal, there is trapped in the tube portion above and between the rollers a measured quantity of liquid which is subsequently discharged from the pump as the rollers continue to advance with the rotation of drive-shaft 18. During a complete 360° rotation of drive shaft 18 two such measured quantities are discharged from the pump, and accordingly predetermined quantities of liquid may be discharged from the pump during a unit time period by controlling the number of unit rotations of drive shaft 18 during this period, and substantially precisely the same quantity is supplied for every rotation regardless of wide variation in the rate of rotation.

In the instant invention control of the number of pumping cycles, each of which corresponds to a 360° rotation of drive-shaft 18, during a unit of time is accomplished through intermittent operation of the pump by means of the intermittent drive mechanism 2. The intermittent drive mechanism 2 includes a clutch mechanism and a variable cam mechanism, generally designated respectively at 34 and 35.

The cylindrical housing portion 6 has a circular outer flange 36 which is concentric to and disposed outwardly of drive-shaft 18. Formed in the end face 66 of flange 36 is a pair of elongated circular grooves 37 and 38. Also formed in end face 66 is a diagonal or cross groove 40. Grooves 37 and 38 are arranged concentrically with respect to each other and with respect to drive-shaft 18, the concentric grooves being separated by rib 39, and rib 39 is interrupted by cross groove or passageway 40 which interconnects and provides communication between grooves 37 and 38. Passageway 40 is adapted to guide elongated flexible land element 41 between the respective concentrically arranged grooves so that the land member 41 may be inserted in inner groove 38, to at least partially fill it for a variable length thereof, and be withdrawn therefrom through connecting groove 40 to and from the outer groove 37.

The elongated flexible land member 41 is, accordingly, adapted to be disposed in the respective grooves and slidable between the concentric grooves 37 and 38 through connecting groove 40. Each of the grooves are keystone in shape when viewed in cross section and increase in width inwardly from their respective openings in end face 66 thereby to retain the land member therein. It will be understood that the maximum breadth of the land member is sufficient to prevent it from passing through the groove openings under normal operating conditions, the land member, however, being adapted for initial insertion in the grooves.

The land member 41 is inserted into inner groove 38 and withdrawn therefrom into outer groove 37 by means of swingable connecting arm 42 which connects with the land 41 and with rotatable shaft 44, the position of the arm 42 being manually controlled through operation of handle 43. Shaft 44 is journalled in bell portion 45 and is positioned in coaxial alignment with drive-shaft 18, the opposite ends 67 and 68 of the shaft 44 protruding from respective opposite sides of bell 45. One end of arm 42 is rigidly connected to inner shaft end 68 by engagement within hole 46, the arm being secured therein by cross pin 47. The other end of arm 42 is pointed in shape to form pointer 49 which engages in hole 50 at an end portion of land member 41 disposed in outer groove 37. Turning of handle 43, secured to the outer end 67 of shaft 44 by set screw 48, causes pointer 49 to sweep outer groove 37 moving end portion 41' of land member 41 with it along the groove. By rotating handle 43, accordingly, arm 42 swings and through its end connection to land 41 slidably moves the flexible land member 41 in and along variable lengths of the respective grooves. As viewed in Fig. 3, the counterclockwise rotation of the arm 42 would cause pointed end 49 to withdraw the flexible land member 41 from groove 38 through passageway 40 whereas clockwise movement of arm 42 would cause the land member to slide into groove 38 from groove 37, thereby at least partially filling a length of groove 38 which is variably determined in accord with the rotative position of handle 43. Screw 51 is positioned in the inner face of end bell 45 to form an arm stop for arm 42 and to prevent the complete withdrawal of land 41 from guide passageway 40 into outer groove 37. As seen in Fig. 2, end bell 45 is secured to the outer flange 36 by screws 52 and 53, shaft 44 extending therethrough and being in coaxial alignment with drive shaft 18. It will also be observed that shaft 18 is coupled by extending into a hollow bearing portion 44' formed in the end 68 of shaft 44, each shaft being freely rotatable with respect to the other.

Follower element or portion 54 of follower arm 55 is arranged and adapted to traverse circular groove 38 in a path which generally extends along and within groove 38 so as to meet and be deflected by the land member 41, during its journey around groove 38, into another path which extends along the land portion for whatever length thereof may be disposed in groove 38. Follower element 54 is integrally formed with follower arm 55, the arm 55 being mounted on and rotatable with hub extension 56 of worm wheel 11 and connected thereto by means of yoke portion 57. The follower arm 55 is arranged to pivot away from worm wheel 11 when the follower element 54 engages land member 41 in groove 38. Such pivotal deflection or displacement of follower arm 55 is permitted by the pivotal connection thereof to the hub extension 56 which connection includes pin 58 which passes through the hub and connects with the opposite arms of yoke 57. Tension spring 59 is secured under tension to worm wheel 11 and to follower arm 55 so as to bias the follower element 54 into the path within slot 38, whereby, when the follower 54 is not engaging land member 41, it follows its normal path in slot 38.

Worm wheel 11 is mounted at its hub 65 on drive-shaft 18, the wheel 11 being freely rotatable with respect to drive-shaft 18 and being driven by worm gear 10 in a counterclockwise direction as viewed in Fig. 3. As mounted on the hub extension 56 of worm wheel 11, follower arm 55 similarly rotates in a counterclockwise direction so that follower element 54 will engage the end 60 of land member 41. Follower element 54 has a beveled land engaging face portion 71, best illustrated in Fig. 4, so as to be smoothly deflected by the end 60 of land member 41 as it passes from its path in groove 38 to its path upon land 41.

Pawl 69 is rigidly connected to follower arm 55 and extends through a hole 70 near the outer edge of worm wheel 11, the hole 60 being in alignment with the adjacent teeth 71 of toothed wheel 62. The toothed wheel 62 is coaxially disposed adjacent worm wheel 11 and is integrally attached at its hub 72 to pump drive-shaft 18. The length of the pawl 69 is such that when the follower 54 is traversing the path within groove 38 it engages with the teeth 61 of toothed wheel 62 and disengages therefrom when the follower 54 is deflected by the land member 41 into its deflected path along the land. The toothed wheel 62 has a plurality of openings or interdental spaces disposed in a ring about its hub 72 and arranged to receive pawl 69 or a pin or detent therein when the pawl is moved toward the wheel. Here the wheel 62 is driven by the pawl 69 when it engages within any of the wheel holes such as between the teeth 61 thereof.

In the operation of the liquid injector, the constant speed motor 3 is continuously turning worm gear 10 which, in turn, is continuously rotating worm wheel 11 in a counterclockwise direction as viewed in Fig. 3. As such follower arm 55, which is rotatably connected to the hub extension 56 of the worm wheel 11, also moves counterclockwise and for a portion of the 360° cycle follows the path within groove 38. Thereafter the follower 54 engages the end 60 of land member 41 which is disposed in groove 38 and for the remaining portion of 360° cycle traverses the groove 38 in the land deflected path, finally riding off the land 51 at a point adjacent to passageway 40, whereat it returns to the path within groove 38 because of the tension in spring 59.

During the portion of the cycle in which the follower is not in engagement with the land, tension spring 59 will hold the follower in the path within the groove 38 and simultaneously cause the pawl 69 to be disposed between adjacent teeth such as 61 of toothed wheel 62. Toothed wheel 62 will, when the pin is so interdentally disposed, be rotated counterclockwise by the engaged pin, thus to impart its rotary motion to pump drive-shaft 18, the rotation of shaft 18 causing the rollers, such as 17, to pass along flexible tube 14 and to discharge liquid therefrom. The rotational direction of shaft 18 as viewed in Fig. 3 is counterclockwise, being the same direction as observed in Fig. 1 as being clockwise.

Once the follower 54 is deflected by the end 60 of land member 41 it continues the rest of its groove traverse in its land deflected path. In being deflected by the land 41, the follower arm 55 pivots away from worm wheel 11, and pawl 69 disengages from the teeth 61 of toothed wheel 62. This disengagement, of course, causes the pumping action to cease until such time as the follower 54 passes from the land deflected path into the other path within the groove 38 at which the pawl 69 again engages between a pair of teeth 61 of the toothed wheel 62. As such it is apparent that the toothed wheel 62 and the pawl 69 cooperate with the follower arm 55 in transmitting the rotary motion of worm wheel 11 to the shaft 18, thus acting as a clutch mechanism which is actuated as the follower 54 drops from the land member 41 into an unfilled portion of groove 38.

From the foregoing it is apparent that the liquid ejector may be continuously operated in a manner whereby it continuously or intermittently discharges a chlorine solution when suitably connected to a source of said solution, the continuous or intermittent operation being determined by whether the land member is disposed in the groove traversed by the follower or not. Furthermore the quantity of liquid expelled by the ejector device during a unit time period depends on the length of the operating groove which is filled by the land member, the greatest amount of liquid being expelled when the land member is withdrawn from the follower traversed groove whereas progressively lesser amounts are discharged from the device as progressively greater lengths of the elongated flexible land are disposed therein.

The flexible land member illustrated comprises an elongated helically wound externally smooth wire cable having the adjacent convolutions closely spaced to each other. Wire cables of the type commonly employed as the inner cable element in automobile speedometer cables are exemplary of the type useful in this invention. It is apparent, however, that other types of land members may be employed so long as they are flexible and adapted to perform the function clearly set forth herein. In this respect, elongated flexible plastic members may be employed such as a flexible plastic tube or a solid elongated plastic member which may be keystone shaped to conform to the cross sectional slope of the grooves.

While only certain preferred embodiment of this invention has been shown and described by way of illustration, many modifications will occur to those skilled in the art and it is, therefore, desired that it be understood that it is intended in the appended claims to cover all such modificatoins as fall within the true spirit and scope of this invention.

What is claimed as new and what it is desired to secure by Letters Patent of the United States is:

1. A variable cam assembly comprising a body member having a face and a pair of concentric circular grooves formed in said member and opening through said face, said grooves being of dovetail shape and having a predetermined width dimension of opening through said face and increasing in width inwardly of said face, an elongated flexible cable land member having a diameter greater than said width dimensions disposed within said grooves, a passageway interconnecting and communicating with said grooves adapted to guide said land member therebetween, means for moving said land member through said passageway from one of said grooves into the other of said grooves and for withdrawing it from said other groove through said passageway into said one of said grooves thereby to at least partially fill said other groove for a variable length thereof, and a follower element arranged to traverse said other groove and to engage and be deflected by said land member.

2. A variable cam assembly comprising a cylindrical housing portion and a driven shaft mounted axially to said housing portion, said housing portion having a flange portion at an end thereof extending outward of said driven shaft and a bell portion closing said end thereof, said flange portion having a pair of circular grooves and another groove formed in an end face thereof, said pair of grooves being arranged concentrically to each other and to said shaft, said other groove interconnecting and communicating with said pair of grooves, said grooves increasing in width inwardly from their respective openings through said face, an elongated land member comprising a flexible cable element disposable in said grooves, said cable element having a diameter greater than the width dimension of said openings through said face whereby said element is caged within said grooves, means for moving said land member along the inner groove of said pair of grooves and for withdrawing it therefrom into the outer groove of said pair of grooves thereby to at least partially fill said inner groove for a variable length thereof, said means including another shaft rotatably mounted in said bell portion coaxially of said cylindrical housing portion and having its ends extending through said bell portion, an arm rigidly connected to an inner end of said other shaft and to an end of said land member in said outer groove, and a handle connected to an outer end of said other shaft, a follower arm mounted on and freely rotatable about said driven shaft and having a follower arranged to traverse the said inner groove in one path as said follower arm rotates about said driven shaft and to be deflected by said land member into another path, said follower arm being further arranged to pivot on said mounting as said follower thereof is deflected by said land member from said one path to said other path, and a spring connected to said follower arm urging said follower into said one path.

3. An intermittent drive mechanism comprising a motor, a clutch including a first element driven by said motor, and a variable cam assembly connecting with said clutch for intermittently actuating said clutch, said cam assembly including a body member having a face with an elongated dovetail groove in said body member, said groove having an opening of predetermined width dimension through said face and increasing in width inwardly of said member, an elongated flexible cable land member disposable in said groove, means for moving said land member along said groove and for withdrawing it therefrom thereby to at least partially fill said groove for a variable length thereof, and in accord with the proportion of said land member which is disposed therein, said cable land member having a diameter greater than said predetermined width dimension whereby said element is caged within said groove, a follower element, said follower element being connected to said first clutch element for driving by said motor in a direction to traverse said groove in one path and periodically to engage and be deflected by said land member into a deflected path, said clutch comprising a second clutch element and pawl means connected to said follower element and operative thereby between respective positions drivingly engaged with and disengaged from said second clutch element in accord with the position of said follower element in said respective paths thereof.

4. An intermittent drive mechanism comprising a housing portion and a driven shaft mounted therein, said housing portion having a face with a pair of dovetail grooves and a third groove interconnecting and communicating therewith extending into said portion and opening through said face, said dovetail grooves having openings through said face of a predetermined width dimension and increasing in width inwardly of said portion, said pair of grooves being arranged concentrically to each other and to said drive shaft, an elongated land member disposable in said grooves, said land member comprising a flexible cable having a diameter greater than said width dimension caged within said dovetail grooves, means for moving said land member inwardly along one of said pair of grooves through said third groove from the other of said pair of grooves and for withdrawing said land member from said one of said grooves through said third groove into said other groove thereby to at least partially fill said one groove for a selected variable length thereof, a follower arm mounted on and freely rotatable about said drive-shaft and having a follower arranged to traverse the said one groove in one path as said arm rotates about said drive shaft and to be deflected by said land member into another path, said follower arm being further arranged to pivot one said mounting as said follower thereof is deflected by said land member from said one path to said other path, motor driven means connecting with said follower arm for continuously rotating said follower arm about said driven shaft, yieldable means for urging said follower from said other into said one path, means drivingly connected to said driven shaft operable to drive said driven shaft, and a pawl rigidly connected to said follower arm adapted and arranged to drivingly engage said last mentioned means as said follower traverses said one groove in said one path and to disengage therefrom as said follower is deflected into said other path by said land member.

5. A liquid ejector comprising a housing and an elastic tube pump having a drive-shaft mounted within said housing, said housing having a circular groove formed therein and arranged concentrically to said drive shaft, an elongated land member disposable in said groove, means for moving said land member inwardly along said groove and for withdrawing it therefrom thereby to at least partially fill said groove for a variable length thereof, a follower arm mounted on and freely rotatable about said drive-shaft and having a follower arranged to traverse said groove in one path as said arm rotates about said shaft and to be deflected by said land member into another path, said follower arm being further arranged to pivot on said mounting as said follower thereof is deflected by said land member from said one path to said other path, means urging said follower arm into said one path, motor driven means for continuously rotating said follower arm about said shaft, means connecting with said shaft operable to drive said shaft, and a pawl rigidly connected to said follower arm arranged and adapted to drivingly engage said last mentioned means as said follower traverses said groove in said one path and to disengage therefrom as said follower is deflected into said other path by said land member.

6. A liquid ejector comprising a housing and an elastic tube pump having a drive-shaft mounted within said housing, said housing having a flange portion at an end thereof extending outwardly of said drive shaft and a bell portion closing said end thereof, said flange portion having a pair of circular grooves and a third groove formed in an end face thereof, said pair of grooves being arranged concentrically to each other and to said drive-shaft, said third groove interconnecting and communicating with said pair of grooves, an elongated flexible land member disposable in said grooves, means for moving said land member inwardly along the inner groove of said pair of grooves and for withdrawing it therefrom through said third groove into the outer groove of said pair of grooves thereby to at least partially fill said groove for a variable length thereof, said means including a second shaft rotatably mounted in said bell portion in coaxial alignment with said drive-shaft and having its ends extending through said bell portion, an arm rigidly connected to an inner end of said second shaft and to an end of said land member in said outer groove, and a handle connected to an outer end of said second shaft manually operable to swing said arm about the axis of said second shaft, a follower arm mounted on and freely rotatable about said drive-shaft and having a follower arranged to traverse said inner groove in one path as said follower arm rotates about said drive shaft and to be deflected by said land member into another path, said follower arm being further arranged to pivot on said mounting as said follower thereof is deflected by said land member from said one path into said other path, spring means urging said follower into said one path, motor driven means for continuously rotating said follower arm about said drive shaft, a wheel connected at its hub to said drive-shaft operable to drive said drive shaft, and a pawl rigidly connected to said follower arm arranged and adapted to drivingly engage said wheel as said follower traverses said inner groove in said one path and to disengage therefrom as said follower is deflected into said other path by said land member.

7. A liquid ejector comprising a housing having a cylindrical portion, an elastic tube pump having a drive-shaft mounted coaxially to said cylindrical portion, said cylindrical housing portion having a flange portion at an end thereof extending outwardly of said drive-shaft and a bell portion closing said end thereof, said flange having a pair of circular grooves and a third groove formed in an end face thereof, said pair of grooves being arranged concentrically to each other and to said drive shaft and said third groove interconnecting and communicating with said pair of grooves, said grooves increasing in width inwardly from their respective openings in said end face, an elongated flexible land member disposable in said grooves, means for moving said land member inwardly along the inner groove of said pair of grooves and for withdrawing it therefrom through said third groove into the outer groove of said pair of grooves thereby to at least partially fill said groove for a variable length thereof, said means including a second shaft rotatably mounted in said bell portion in coaxial alignment with said drive shaft and having its ends extending through said bell portion, an arm rigidly connected to an inner end of said second shaft and to an end of said land member in said outer groove, and a handle connected to an outer end of said second shaft manually operable to swing said arm about the axis of said second shaft and thereby to position said land member in said grooves, a worm wheel mounted at its hub on and freely rotatable about said drive shaft and having a hub extension, a follower arm mounted on said hub extension and having a follower arranged to traverse said inner groove in one path as said follower arm rotates about said drive shaft on said worm wheel and to be deflected by said land member into another path, said follower arm being further arranged to pivot on said hub extension as said follower thereof is deflected by said land member from said one path into said other path, a tension spring connected to said follower arm and to said worm wheel urging said follower into said one path, a motor drivingly connected to said worm wheel for continuously driving said wheel, a toothed wheel adjacent said worm wheel and drivingly connected at its hub to said drive shaft, said worm wheel having a hole therethrough in alignment with the teeth of said toothed wheel, and a pawl rigidly connected to said follower arm through said hole arranged and adapted to drivingly engage the teeth of said toothed wheel as said follower traverses said inner groove in said one path and to disengage therefrom as said follower is deflected into said other path by said land member.

8. A variable cam assembly comprising a shaft, a housing having a bearing for said shaft and including a flat annular surface disposed outwardly of and perpendicular to said shaft, a pair of annular channels opening through said surface and of width increasing with depth inwardly of said surface, said channels being coaxial about said shaft and one lying outwardly of the other, a gear wheel freely rotatably mounted on said shaft in said housing, means for rotating said wheel, an arm disposed adjacent one side of said wheel and extending outwardly beyond the periphery thereof, means mounting said arm at a portion inwardly of said periphery swingably to said wheel, a pin mounted on said arm extending through an aperture in said wheel and projecting from the opposite side thereof, the outer end of said arm comprising a cam follower disposed in said other channel, spring means connected between said wheel and said arm urging said arm to swing in a direction to move said follower into said groove, a wheel fixed to said shaft disposed adjacent said gear wheel and having a plurality of apertures therein located and proportioned to receive the projecting portion of said pin therein, a cross channel interconnecting said annular channels, a flexible cable element having a diameter greater than the width of the openings at said surface into said annular channels and caged therein and disposed partially in said one of said annular channels, through said cross channel and into the other said annular channel, said follower being forced outwardly of said other channel by the cable element therein, and means engaging the end of said cable element which is disposed in said one annular channel and traversable along said one channel for adjusting the length of said cable element in said other annular channel.

References Cited in the file of this patent

UNITED STATES PATENTS

| 2,219,040 | Harper | Oct. 22, 1940 |
| 2,334,148 | Jones | Nov. 9, 1943 |
| 2,813,491 | Herreshoff et al. | Nov. 19, 1957 |

FOREIGN PATENTS

| 683,055 | Germany | Oct. 28, 1939 |